United States Patent

[11] 3,611,910

| [72] | Inventor | John S. Hughes |
| | | East Rochester, N.Y. |
| [21] | Appl. No. | 521,043 |
| [22] | Filed | Jan. 17, 1966 |
| [45] | Patented | Oct. 12, 1971 |
| [73] | Assignee | Robeson Cutlery Co., Inc. |
| | | Perry, N.Y. |

[54] CORN POPPER
9 Claims, 5 Drawing Figs.

[52] U.S. Cl. .................................................. 99/238.1,
99/81, 220/40
[51] Int. Cl. ................................................... A23l 1/18
[50] Field of Search ........................................... 219/385,
433, 441, 472, 473; 99/238, 238.1–238.7, 340,
341, 81; 220/4, 40

[56] References Cited
UNITED STATES PATENTS

| 1,642,531 | 9/1927 | Barnard | 99/238.1 UX |
| 1,974,360 | 9/1934 | Kimmel | 219/441 |
| 1,992,843 | 2/1935 | Serenberg et al. | 219/472 X |
| 2,105,201 | 1/1938 | Richheimer | 220/40 |
| 2,364,125 | 12/1944 | Bruening | 220/4 |
| 2,522,085 | 9/1950 | Beckemeyer et al. | 99/238.1 X |
| 2,650,736 | 9/1953 | Curry | 220/4 |
| 2,659,222 | 11/1953 | Meier | 220/4 UX |
| 2,661,862 | 12/1953 | Howe | 220/40 |
| 2,901,587 | 8/1959 | Burreson | 99/238.3 X |
| 2,923,803 | 2/1960 | Kueser | 99/238.1 X |

*Primary Examiner*—Billy J. Wilhite
*Attorney*—Cumpston & Shaw

ABSTRACT: Corn is popped in a shallow base covered by a substantially larger dome so that the popped corn rises into the dome, and the dome is constructed so that the dome and the base can be inverted to rest the popper on the dome for separating the base from the dome and serving the popped corn in the dome. The dome is preferably transparent and removably interlocked with the base which preferably contains an electric heater.

PATENTED OCT 12 1971  3,611,910

INVENTOR.
JOHN S. HUGHES
BY Cumpston & Shaw
ATTORNEYS

CORN POPPER

This invention relates to an apparatus for popping and serving corn.

The apparatus of this invention comprises a base and a dome separable from the base. The base comprises a thermally conductive pan, heating means for heating the pan and support means for supporting the pan. The dome fits on top of the base, covering the pan when in position and providing an enclosed space in which to pop corn and in which to accumulate the popped corn. Subsequently, it can function as a serving bowl for the popped corn. Preferably, the dome is at least translucent so that accumulation of popped corn can be at least partially viewed. Preferably the base and dome comprise means for establishing and maintaining the dome in position on the base during the corn popping operation.

The apparatus of this invention is used generally by placing popcorn kernels and cooking oil on the pan, seating the dome in position on the base and activating the heating means. When the pan and kernels reach corn popping temperature, kernels commence to pop within the confines of the dome. When popping of the corn kernels is completed, the heating means are deactivated, the corn popper is inverted so that the dome supports it, and the base is removed from the dome, thereby presenting a bowl of popped corn.

Because of this flip or inversion feature of the invention, the dome can be regarded as a bowl, and the base can be regarded as a cover for the bowl with the pan being considered the lid. This invention is further illustrated by the drawing which is a material part of these disclosures.

Figure 1:
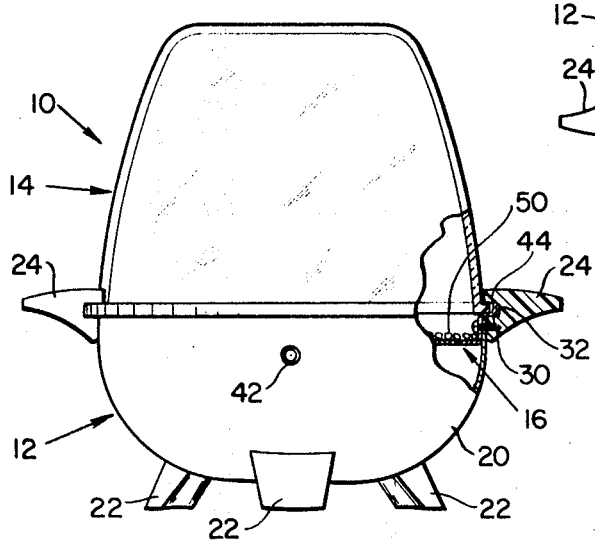
FIG. 1 is a front elevation of a preferred, specific embodiment of the corn popper of this invention with a portion of the exterior structure removed to reveal interior structure.
Figure 2:
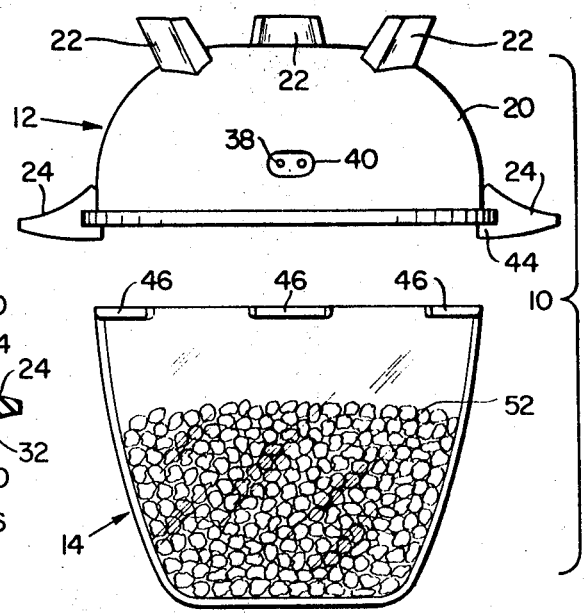
FIG. 2 is a back view of the specific embodiment of FIG. 1 in inverted position with the base or cover removed from the dome or bowl, and with the dome or bowl turned relative to the base to enable the base to be lifted therefrom, and further showing popped corn in the bowl.
Figure 3:
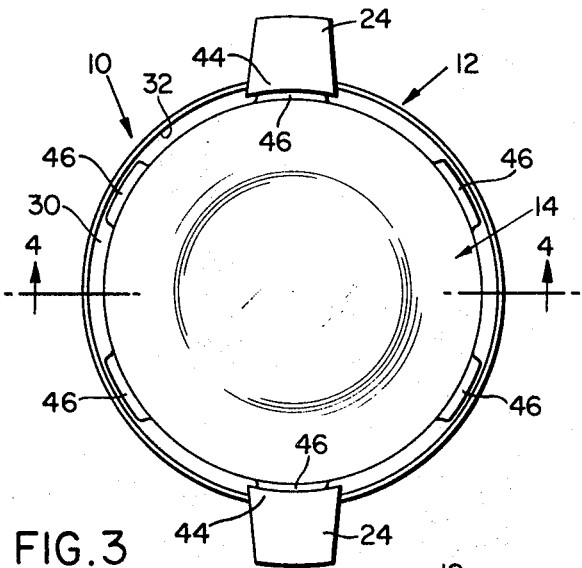
Figure 4:
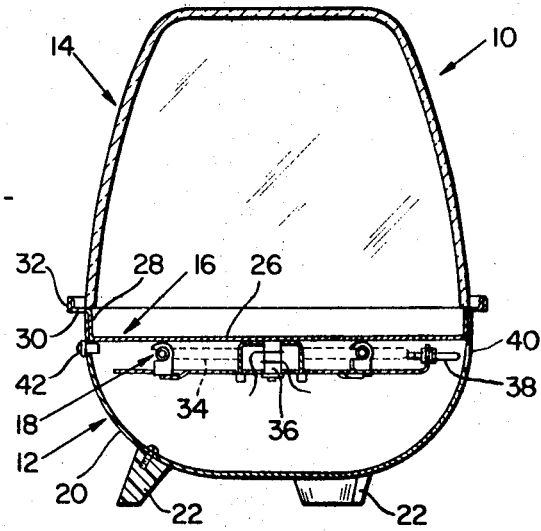
Figure 5:
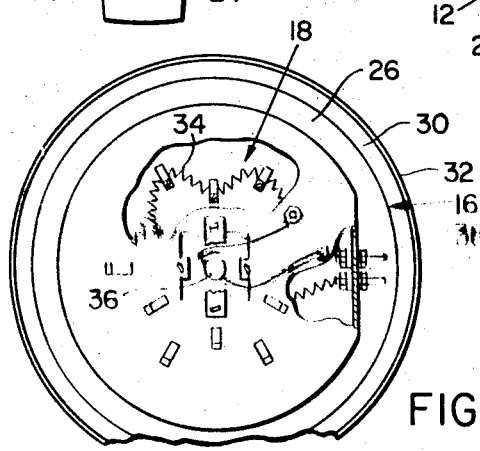

FIG. 3 is a plan view of the specific corn popper of FIG. 1, but turned 90°; FIG. 4 is a sectional view of the corn popper of FIG. 1, which view has been taken as indicated by the sectioning plane 4—4 in FIG. 3; and FIG. 5 is a bottom view of the pan and heating means of the base of the corn popper of FIGS. 1–4 without the support means and with portions of the heating means structure removed to reveal otherwise hidden structure. More specifically, FIGS. 1–4 disclose a corn popper 10 according to this invention. The corn popper comprises a base or cover member 12 and a dome or bowl member 14.

The base or cover member 12 comprises a pan or lid member 16, a heating element assembly 18, support means comprising a housing 20 with legs 22, and handles 24.

The pan or lid member 16 comprises a preferably round, thermally conductive plate 26 with a preferably annular, axially outwardly extending wall 28 (see FIG. 4). At the axially outer end of the annular wall 28 is a radially outwardly extending preferably annular shelf or rim 30 having at its radially outer margin an axially outwardly extending, preferably annular, centering flange 32. On the axially inner side of the pan 16, that is, of the plate 26, and fastened thereto is the heating element assembly 18.

The heating element assembly 18 in the embodiment shown (see FIGS. 4 and 5) is of conventional construction. It comprises a helical heating element 34, a thermostatic switch 36 and a pair of electrical inlet prongs 38 with insulated wiring connecting the prongs, the heating element and the thermostatic switch in series.

The housing 20 comprises a shell preferably generally semiellipsoidal in shape (FIG. 4) with a preferably round rim. In the region of the rim the shell has an aperture 40 for receiving a female socket plug of an electrical line cord, and diametrically disposed to the aperture 40 a peep hole in which is seated in a clip mounting in line with a portion of the heating element 34 a viewing glass 42. The legs 22 are fastened to the shell so that when the shell is supported by them on a horizontal surface, the rim of the shell is generally horizontal.

The handles 24, which in the embodiment shown are two in number, are diametrically disposed at the rim of the shell of the housing 20 and are fastened thereto as well as to the pan 16. Each handle 24 has a retainer portion 44, (see FIG. 1) which overlaps the shelf or rim 30 of the pan 16 when the pan is in position, but which portion 44 is spaced from the rim 30.

The dome or bowl 14 preferably is transparent and can withstand sudden and severe temperature changes. It comprises at its rim radially outwardly extending, circumferentially spaced flanges 46 (See FIGS. 3 and 2). The circumferential spacing between the flanges is greater than the maximum circumferential dimension of the overlapping, retainer portion 44 of each handle 24 of the base 12.

To use the corn popper 10, the base 12 is placed with the legs 22 on a suitable surface and the pan 16 facing upwardly. With the dome 14 removed, popcorn kernels and cooking oil are placed into the pan 16. The dome 14 is then placed on top of the pan 16 and turned so as to place flanges 46 under the overlapping portions 44 of the handles 24 as in FIGS. 1 and 3. A female plug of a line cord connected to a suitable source of electrical current is brought into engagement with the prongs 38, whereupon the heating element 34 commences to emit heat and a red glow which can be seen through the viewing glass 42. Heat emitted from the heating element 34 is conducted by the plate 26 to the cooking oil and popcorn kernels. In a short period of time the kernels pop. When the popping of the corn kernels ceases, the heating element is deactivated as by removing the female socket plug of the line cord from the prongs 38. The corn popper 10 is then inverted so that it rests on the dome 14, now a bowl. The popped corn falls away from the pan 16, thereby preventing popped corn from becoming burned by heat which might still be in the pan 16. The base 12, now a cover, is then rotated relative to the bowl 14 so as to move flanges 46 away from the overlapping portions 44 of the handles 24, and the cover 12 is removed from the bowl 14 as in FIG. 2. The bowl 14 can then be used for serving the popped corn.

Thus there is provided a corn popper.

A feature of advantage of the corn popper of this invention is that upon completion of corn popping the popcorn can be immediately removed from contact with the pan 16 and thereby prevent burning of the popped corn.

Another feature of advantage of the corn popper of this invention in its preferred embodiment is that the corn popping process can be observed from beginning to end.

Other features, advantages and specific embodiments of this invention will be readily apparent to those in the exercise of ordinary skill in the art upon reading the foregoing disclosures. These specific embodiments are within the scope of the claimed subject matter unless otherwise indicated. Also, while a specific embodiment of this invention has been described in considerable detail, variations and modifications of this specific embodiment can be effected without departing from the spirit and scope of the invention as disclosed and claimed.

What is claimed is:

1. Lid means for a corn popper comprising said lid means and bowl means comprising a bowl with a round rim having radially outwardly extending, circumferentially spaced flanges, said lid means comprising:

a. a generally round, thermally conductive plate with annular, peripheral, radially outwardly extending shelf with annular, peripheral, axially outwardly extending centering flange means, said bowl means with said flanges being receivable on said shelf within said centering flange means in such a manner that the rim of said bowl as well as said flanges thereon fit within said plate centering flange means;

b. peripherally spaced, radially inwardly extending bowl retainer means that overlap said flanges of said bowl means when said bowl is in position with the rim thereof adjacent said shelf of said lid means;

c. electrical heating element means for said plate; and d. housing means about the axially inner side of said plate, said housing means comprising support means for said lid means when inverted with said bowl means on top of said lid means.

2. A corn popper comprising:
a. a base;
b. means for supporting said base in popping position on a flat surface;
c. a pan arranged in said base for containing unpopped kernels of popcorn, when said base is in said popping position;
d. heating means arranged in said base for heating said pan to pop said kernels;
e. a single piece dome separably supported on said base over said pan when said base is in said popping position;
f. the inside volume of said pan being substantially less than the volume of a full charge of popped corn for said popper;
g. the inside volume of said dome being several times the inside volume of said pan so that said popped corn rises into said dome; and
h. the uppermost surface of said dome in said popping position being formed with at least three substantially spaced points lying approximately in a plane parallel with said flat surface so that said dome stably supports itself and said base on a flat surface in a position inverted from popping position for removal of said base from said dome and serving of said popped corn in said dome.

3. The corn popper of claim 2 including means for interlocking said base and said dome removably together.

4. The corn popper of claim 3 wherein to provide said interlocking means said dome is formed with a round rim having radially outward extending, circumferentially spaced flanges, and said base has a shelf for supporting said flanges and radially inwardly extending dome retainer means that are spaced from said shelf by about the thickness of said flanges and are narrower than the space between said flanges.

5. The corn popper of claim 4 wherein said base includes a pair of handles having portions arranged to extend radially inward to form said dome retainer means.

6. The corn popper of claim 3 wherein said interlocking means comprises handles on said base.

7. The corn popper of claim 2 wherein said uppermost surface of said dome is substantially flat.

8. The corn popper of claim 2 including handles arranged for inverting said base and said dome together.

9. A corn popper comprising a shallow cooking vessel for receiving popping corn and cooking oil in which said corn is popped, electric heating means mounted in heat exchange relation with the exterior of said vessel, housing and stand means for supporting said vessel in an upright position, said housing insulating said heating means from a surface on which said popper is supported, an enlarged cover for said vessel having a mouth defined by the downwardly extending walls thereof, said cover being supported with said mouth superimposed over said vessel, said cover having a volume substantially greater than the volume of said vessel, and handle means for retaining said vessel and cover in assembled relation and for inverting said vessel and cover as a unit, said cover having a stand permitting it to rest in an inverted position whereby the cover serves as a container and the vessel serves as a cover.

Disclaimer

3,611,910.—*John S. Hughes*, East Rochester, N.Y. CORN POPPER. Patent dated Oct. 12, 1971. Disclaimer filed May 25, 1976, by the assignee, *Ropat Corporation*.

The term of this patent subsequent to Jan. 9, 1981, has been disclaimed.

[*Official Gazette July 27, 1976.*]